US008875598B2

(12) United States Patent
Horiuchi et al.

(10) Patent No.: US 8,875,598 B2
(45) Date of Patent: Nov. 4, 2014

(54) UNIT TYPE WAVE GEAR DEVICE

(75) Inventors: Masashi Horiuchi, Nagano (JP);
Akihiro Yokoyama, Nagano (JP);
Naomi Shirasawa, Nagano (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 14/112,996

(22) PCT Filed: May 16, 2011

(86) PCT No.: PCT/JP2011/002720
§ 371 (c)(1),
(2), (4) Date: Oct. 21, 2013

(87) PCT Pub. No.: WO2012/157022
PCT Pub. Date: Nov. 22, 2012

(65) Prior Publication Data
US 2014/0047938 A1    Feb. 20, 2014

(51) Int. Cl.
*F16H 33/00* (2006.01)
*F16H 35/00* (2006.01)
*F16H 37/00* (2006.01)
*F16H 49/00* (2006.01)
*F16C 19/36* (2006.01)
*F16C 19/55* (2006.01)

(52) U.S. Cl.
CPC ............ *F16H 49/001* (2013.01); *F16C 19/362* (2013.01); *F16C 19/55* (2013.01)
USPC ......................................................... 74/640

(58) Field of Classification Search
USPC ........................................... 74/640; 384/447
See application file for complete search history.

(56) References Cited

U.S. PATENT DOCUMENTS

| 5,860,331 | A | 1/1999 | Hashimoto et al. |
| 7,165,473 | B2 * | 1/2007 | Kobayashi et al. ............. 74/640 |
| 2004/0048715 | A1 | 3/2004 | Shirakawa |
| 2004/0081379 | A1 | 4/2004 | Shirakawa |

FOREIGN PATENT DOCUMENTS

| EP | 945650 A1 | 9/1999 |
| JP | H09-250608 A1 | 9/1997 |
| JP | H09-280326 A | 10/1997 |

(Continued)

OTHER PUBLICATIONS

International Search Report for PCT/JP2011/002720, Aug. 2, 2011.

*Primary Examiner* — Troy Chambers
*Assistant Examiner* — Jake Cook

(57) ABSTRACT

A unit type wave gear device (1) has a unit housing (2), one end of which is defined by a two-stage cross roller bearing (7). The two-stage cross roller bearing (7) has: an inner cross roller bearing formed by an inner ring (13), an intermediate ring (12), and inner rollers (17) inserted into an inner track (16); and has an outer cross roller bearing formed by an outer ring (11), the intermediate ring (12), and outer rollers (15) inserted into an outer track (14). A flexible externally-toothed gear (22) affixed to the intermediate ring (12) is rotatably supported by the unit housing (2) via the outer cross roller bearing. An input shaft (4) affixed to the inner ring (13) and a wave generator (23) affixed to the input shaft (4) are rotatably supported by the intermediate ring (12) via the inner cross roller bearing. A unit type wave gear device can be realized in which the number of components are reduced and a large moment load is applied.

8 Claims, 2 Drawing Sheets

(56) References Cited

FOREIGN PATENT DOCUMENTS

| | | |
|---|---|---|
| JP | H10-96452 A | 4/1998 |
| JP | 2010-91073 A | 4/2010 |
| WO | 03/050428 A1 | 6/2003 |
| WO | 03/050435 A1 | 6/2003 |

* cited by examiner

UNIT TYPE WAVE GEAR DEVICE

TECHNICAL FIELD

The present invention relates to a unit type wave gear device which has a small number of components, which is easily assembled, and which can be linked to a motor shaft from either side of an axial direction.

BACKGROUND ART

A known example of a wave gear device is a unit type in which a wave gear mechanism is incorporated into a housing, such as those disclosed in Patent Documents 1 and 2. In the unit type wave gear devices disclosed in these patent documents, a silk hat type wave gear mechanism is incorporated within a housing configured from a first end plate and a second end plate disposed at the sides of the device's axial direction, and a cross roller bearing disposed between the end plates. An input shaft extending through the center of the device is rotatably supported at both ends respectively by the first end plate and the second end plate via ball bearings.

In the unit type wave gear devices disclosed in Patent Documents 1 and 2, a wave gear mechanism is concentrically incorporated on the inner side of a cross roller bearing. Consequently, the axial dimension of the device can be reduced, which is advantageous towards making the unit type wave gear device flatter. A multi-stage cross roller bearing is provided in Patent Document 3 as a cross roller bearing.

PRIOR ART DOCUMENTS

Patent Documents

[Patent Document 1] JP-A 09-250608
[Patent Document 2] JP-A 09-280326
[Patent Document 3] WO2003/050428

SUMMARY OF THE INVENTION

Problems to be Solved by the Invention

Depending on the application of the unit type wave gear device, demand can be greater for reducing the number of components and making the device easier to assemble than it is for making the device smaller. Unit type wave gear devices that can bear a large moment load may also be required.

An object of the present invention is to provide unit type wave gear device that can satisfy such demands.

Means to Solve the Problems

To solve the problems described above, in the unit type wave gear device of the present invention, one axial-direction end of a unit housing thereof is defined by a two-stage cross roller bearing in which an inner cross roller bearing and an outer cross roller bearing are formed concentrically. In the two-stage cross roller bearing, the inner cross roller bearing is configured from an inner ring, an intermediate ring, and a plurality of inner rollers inserted into an inner track formed between the inner and intermediate rings; and the outer cross roller bearing is configured from an outer ring, the intermediate ring, and a plurality of outer rollers inserted into an outer track formed between the outer and intermediate rings. A flexible externally toothed gear fixed to the intermediate ring is rotatably supported by the unit housing via the outer cross roller bearing, and both an input shaft fixed to the inner ring and a wave generator fixed to the input shaft are rotatably supported by the intermediate ring via the inner cross roller bearing.

Specifically, to give a description with reference to the forthcoming embodiment, a unit type wave gear device (1) of the present invention is characterized in that the unit type wave gear device (1) comprises:

a tubular unit housing (2);

a wave gear mechanism (3) coaxially disposed inside the unit housing (2); and an input shaft (4) passing through the center of the wave gear mechanism (3) and extending coaxially with the wave gear mechanism (3);

the unit housing (2) is configured from a cylindrical member (5), an end plate (6) fixed to a first end face (5a) at one end on an axis line (1a) of the cylindrical member (5), and a two-stage cross roller bearing (7) disposed on a side of the cylindrical member (5) having a second end face (5b) at the other end on the axis line (1a);

the two-stage cross roller bearing (7) has an outer ring (11) fixed to the second end face (5b) of the cylindrical member (5), an intermediate ring (12) concentrically disposed on the inner side of the outer ring (11), an inner ring (13) concentrically disposed on the inner side of the intermediate ring (12), an outer track (14) of rectangular cross-section formed between the outer ring (11) and the intermediate ring (12), a plurality of outer rollers (15) rollably inserted into the outer track (14), an inner track (16) of rectangular cross-section formed between the intermediate ring (12) and the inner ring (13), and a plurality of inner rollers (17) inserted in a rollable state into the inner track (16);

the wave gear mechanism (3) has an annular rigid internally toothed gear (21), a flexible externally toothed gear (22) concentrically disposed on the inner side of the rigid internally toothed gear (21), and a wave generator (23) coaxially disposed on the inner side of the flexible externally toothed gear (22); the flexible externally toothed gear (22) has a flexible barrel part (22a) having a cylindrical shape, a diaphragm (22b) widening outward in a radial direction from the end of the barrel part (22a) near the two-stage cross roller bearing (7), a rigid boss (22c) having an annular shape and integrally formed in the outer circumferential edge of the diaphragm (22b), and external teeth (22d) formed in the outer circumferential face portion of the end of the barrel part (22a) near the endplate (6); the rigid internally toothed gear (21) being fixed to the cylindrical member (5), the boss (22c) being fixed to the intermediate ring (12), and the wave generator (23) being fixed to the input shaft (4) extending through the center of the wave generator (23); and a shaft end part (4a) of the input shaft (4) on the side near the two-stage cross roller bearing (7) is fixed to the inner ring (13).

In the unit type wave gear device of the present invention, the shaft end part of the input shaft on the side near the end plate is preferably a protruding shaft end part that protrudes outward through a center through-hole in the end plate. When the end plate side is a rotating input side, the protruding shaft end part is preferably linked to the motor shaft, and when the opposite side having the two-stage cross roller bearing is a rotating input side, the inner ring of the two-stage cross roller bearing is preferably linked to the motor shaft.

The unit type wave gear device of the present invention can be a hollow device comprising a hollow part extending through the input shaft and the inner ring.

Effect of the Invention

According to the unit type wave gear device of the present invention, because the input shaft is supported by the inner cross roller bearing, it is possible to use fewer components than with a conventional unit type wave gear device in which the input shaft is supported by two ball bearings and a flexible externally toothed gear is supported by a cross roller bearing. The task of installing the input shaft, the flexible externally toothed gear, and the tubular member respectively on the preassembled inner ring, intermediate ring, and outer ring of the two-stage cross roller bearing is preferably performed, and assembly is also facilitated because there is no need for the task of inserting ball bearings between the two end plates and the input shaft. Furthermore, because the input shaft to which the wave generator is fixed is supported by the cross roller bearing, it is possible to bear a moment load at least equivalent to that encountered when the wave generator is supported by two ball bearings as in conventional practice.

MODE FOR CARRYING OUT THE INVENTION

Figure 1:
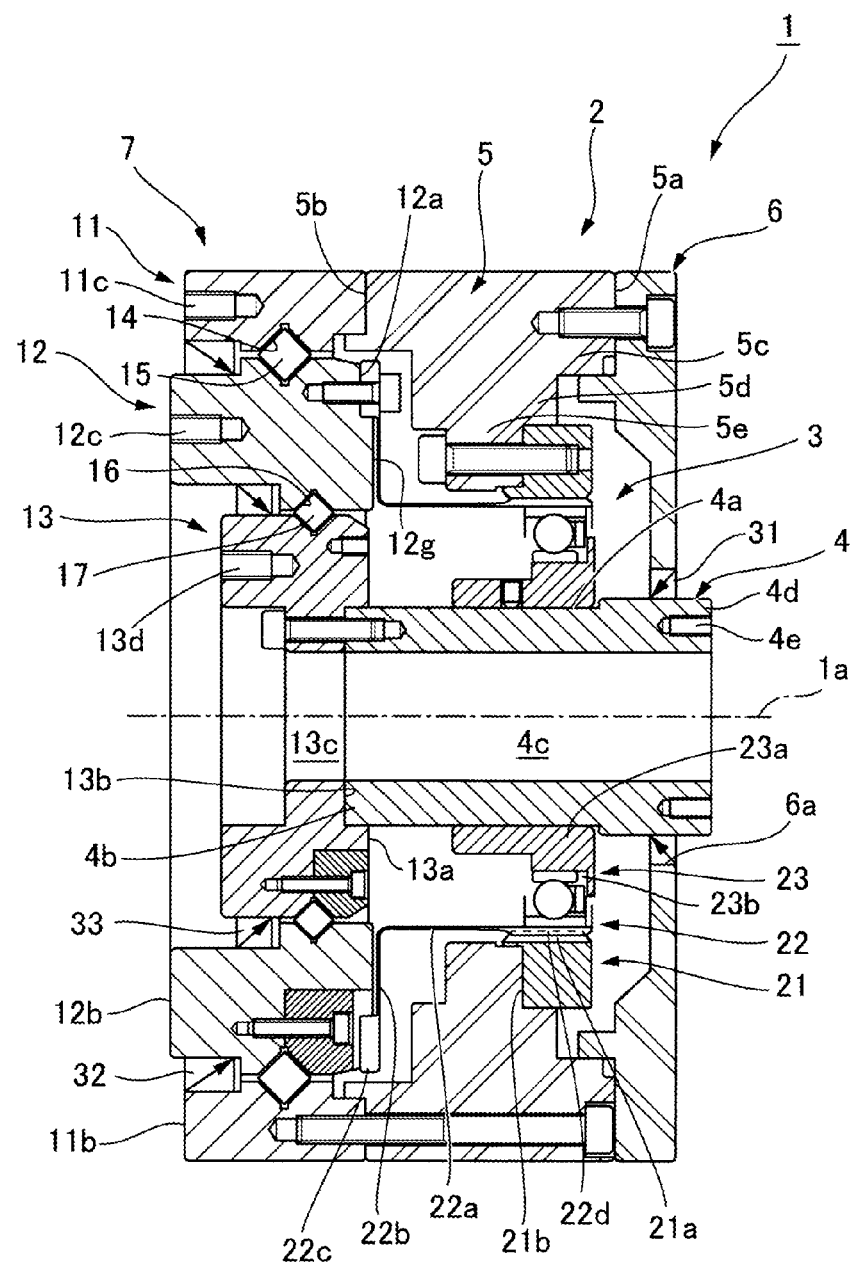
FIG. 1 is a longitudinal cross-sectional view showing an embodiment of a unit type wave gear device to which the present invention is applied.

FIG. 1 is used as a reference to describe an embodiment of a unit type wave gear device to which the present invention is applied. A unit type wave gear device 1 comprises a cylindrical unit housing 2, a wave gear mechanism 3 incorporated within the unit housing 2, and an input shaft 4 extending coaxially through the center of the wave gear mechanism 3. The unit housing 2 is configured from a cylindrical member 5, a discoid end plate 6 fixed to an annular end face 5a at one end of an axis line 1a in the cylindrical member 5, and a two-stage cross roller bearing 7 disposed on the side of an annular end face 5b of the cylindrical member 5, the end face 5b being located at the other end of the axis line 1a.

The two-stage cross roller bearing 7 comprises an outer ring 11 fixed to the annular end face 5b of the cylindrical member 5 of the unit housing 2, an intermediate ring 12 concentrically disposed on the inner side of the outer ring 11, and an inner ring 13 concentrically disposed on the inner side of the intermediate ring 12. An annular outer track 14 having a rectangular cross section is formed between the outer ring 11 and the intermediate ring 12, and a plurality of outer rollers 15 are rollably inserted into the outer track so that the center axis lines of the outer rollers intersect each other. An outer cross roller bearing is configured by the outer ring 11, the intermediate ring 12, the outer track 14, and the outer rollers 15. Similarly, an annular inner track 16 having a rectangular cross section is formed between the intermediate ring 12 and the inner ring 13, and a plurality of inner rollers 17 are inserted in a rollable state into the inner track so that the center axis lines of the rollers intersect each other. An inner cross roller bearing is configured by the intermediate ring 12, the inner ring 13, the inner track 16, and the inner rollers 17.

The wave gear mechanism 3 in the unit housing 2 comprises an annular rigid internally toothed gear 21, a flexible externally toothed gear 22 coaxially disposed on the inner side of the rigid internally toothed gear 21, and a wave generator 23 coaxially disposed on the inner side of the flexible externally toothed gear 22. The flexible externally toothed gear 22 comprises a flexible barrel part 22a having a cylindrical shape and being capable of flexing in the radial direction, a diaphragm 22b widening outward in the radial direction from the end of the barrel part 22a on the side having the two-stage cross roller bearing 7, and a rigid boss 22c having an annular shape formed integrally with the outer circumferential edge of the diaphragm 22b. External teeth 22d are formed in the external outer circumferential face portion of the end of the barrel part 22a on the side having the end plate 6.

The wave generator 23 is fitted into the portion of the flexible externally toothed gear 22 where the external teeth 22d are formed, and is provided with a rigid plug 23a having an ellipsoidal contour and coaxially fixed in a fastened manner to the input shaft 4, and a wave bearing 23b fitted to the outer circumferential face of the rigid plug 23a. The inner and outer rings of the wave bearing 23b are flexible. The portion of the flexible externally toothed gear 22 where the external teeth 22d are formed is made to flex into an ellipsoidal shape, and the portions of the external teeth 22d that are positioned at the ends of the major axis of this ellipsoid mesh with internal teeth 21a portions of the rigid internally toothed gear 21.

In the wave gear mechanism 3 of this configuration, the rigid internally toothed gear 21 is fixed in a fastened manner to the cylindrical member 5 of the unit housing 2. The cylindrical member 5 has a cross-sectional shape in which the outer circumferential region constitutes a large-width portion 5c, a medium-width portion 5d having a narrower width being formed on the inner circumferential side thereof, and a small-width portion 5e even narrower in width being formed on the inner circumferential side thereof. An annular end face 21b of the rigid internally toothed gear 21 is fixed in a fastened manner to an annular end face of the small-width portion 5e. In the flexible externally toothed gear 22, an annular end face of an annular boss 22c thereof is fixed in a fastened manner to an annular ridged face 12a formed on the outer circumferential side of an annular end face 12g on the inner side of the intermediate ring 12 of the two-stage cross roller bearing 7. The wave generator 23 is fixed in a fastened manner to an outer circumferential face 4a of the input shaft 4 as previously described.

The input shaft 4 is coaxially fixed in a fastened manner to the inner ring 13 of the two-stage cross roller bearing 7. Specifically, a shaft end part 4b on the inner side of the input shaft 4 is fitted into an annular concave part 13b formed in the inner circumferential edge of an annular end face 13a on the inner side of the inner ring 13, in which state the shaft end part 4b is fixed in a fastened manner to the inner ring 13. A center through-hole 4c of the input shaft 4 and a center through-hole 13c of the inner ring 13 have the same inside diameter, whereby a hollow part is formed extending through the center of the unit type wave gear device 1.

The shaft end part of the input shaft 4 on the side having the end plate 6 is a protruding end shaft part 4d that protrudes outward through a center through-hole 6a of the endplate 6, and screw holes 4e used in order to connect a rotating input member such as a motor shaft are formed at fixed angular intervals in the annular end face of the protruding end shaft part 4d. Screw holes 13d used in order to connect a rotating input member such as a motor shaft are also formed at constant angular intervals in the outer annular end face in the inner ring 13 of the two-stage cross roller bearing 7 on the opposite side.

Screw holes 11c used in order to fixedly connect the outer ring 11 to a rotating output-side member (a load-side member) or a fixed-side member are formed at fixed angular intervals in an outer annular end face 11b in the outer ring 11 of the two-stage cross roller bearing 7. Screw holes 12c used for fixedly connecting the intermediate ring 12 to a rotating output-side member (a load-side member) or a fixed-side member are similarly formed at constant angular intervals in an outer annular end face 12b in the intermediate ring 12.

In the side having the end plate 6, the space between the outer circumferential face of the protruding end shaft part 4d of the input shaft 4 and the inner circumferential face of the end plate 6 is sealed by an oil seal 31. In the two-stage cross roller bearing 7 on the opposite side, the space between the outer ring 11 and the intermediate ring 12 and the space between the intermediate ring 12 and the inner ring 13 are sealed by oil seals 32, 33, respectively.

In this unit type wave gear device 1, the input shaft 4 is rotatably driven by a rotating input member (not shown) fixed in a fastened manner to the protruding end shaft part 4d of the input shaft 4. Otherwise, the input shaft is rotatably driven by a rotating input member (not shown) fixed in a fastened manner to the input shaft 4 via the inner ring 13 on the opposite side. When the input shaft 4 rotates, the wave generator 23 fixed thereto rotates integrally. When the wave generator 23 rotates, the meshed positions of the flexible externally toothed gear 22 and the rigid internally toothed gear 21, which are meshed together by the wave generator 23, move in the circumferential direction. As a result, relative rotation occurs between these two gears, the rotation corresponding to the difference 2 n (n being a positive integer) in the number of teeth between the two gears. When the rigid internally toothed gear 21 is fixed so as to not rotate, the flexible externally toothed gear 22 rotates and reduced rotation is outputted via the intermediate ring 12 to which the flexible externally toothed gear is fixedly connected. When the flexible externally toothed gear 22 is fixed so as to not rotate, the rigid internally toothed gear 21 rotates and reduced rotation is outputted via the outer ring 11 to which the rigid internally toothed gear is fixedly connected.

In a multi-stage cross roller bearing having a structure in which cross roller bearings are concentrically disposed in multiple stages, deformation of precompression occurs in the inner ring of the outer cross roller bearing and the intermediate ring which function as an outer ring of the inner cross roller bearing, and it is difficult to ensure that the inner and outer cross roller bearings will rotate smoothly. However, because the two-stage cross roller bearing 7 of the present example is configured as described below, such problems can be overcome.

Figure 2:
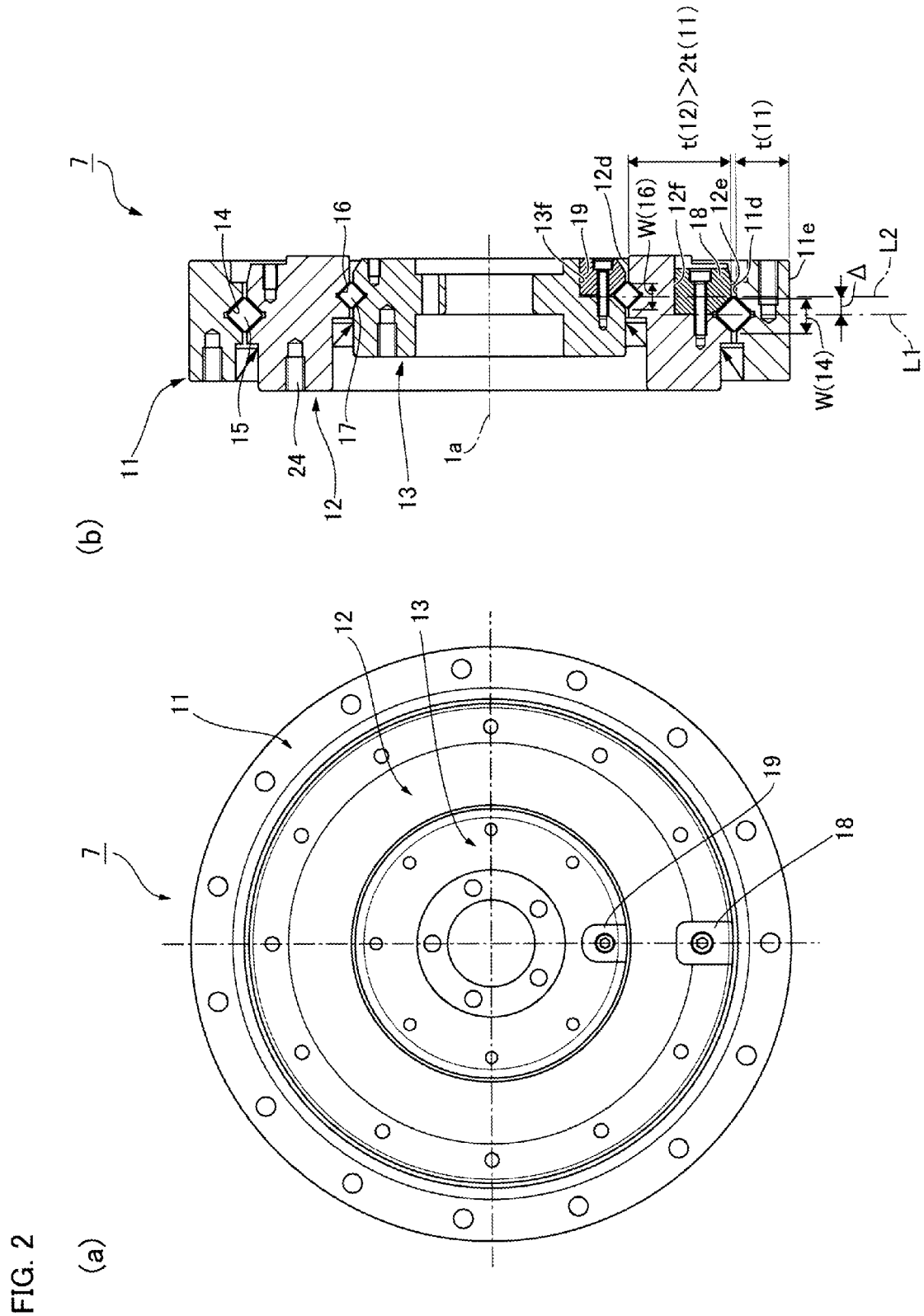
FIG. 2 is an end face view and a longitudinal cross-sectional view showing the two-stage cross roller bearing of FIG. 1.

The following description makes reference to FIG. 2. In the two-stage cross roller bearing 7 of the present example, the roller size of the inner cross roller bearing, i.e., the size of the inner rollers 17 is smaller than the roller size of the outer cross roller bearing, i.e., the size of the outer rollers 15. The roller center L2 of the inner rollers 17 is in a position offset from the roller center L1 of the outer rollers 15 in the direction along the axial line 1a of these cross roller bearings.

Thus, in the two-stage cross roller bearing 7, because the small-diameter inner cross roller bearing has a small roller size and the large-diameter outer cross roller bearing has a large roller size, the precompression stress acting on the intermediate ring 12 from the inner and outer sides can be equalized when the two-stage cross roller bearing 7 has been assembled. Because the roller center L1 of the outer cross roller bearing and the roller center L2 of the inner cross roller bearing are in a position offset in the direction of the center axial line of the bearings, the deformation of precompression occurring in the intermediate ring 12 can be less than when the roller centers are positioned in the same plane in the radial direction. As a result, the deformation of precompression in the intermediate ring 12 can be suppressed when the two-stage cross roller bearing 7 has been assembled, and the cross roller bearings can be ensured to rotate smoothly.

The offset amount Δ of the roller center L2 of the inner rollers 17 relative to the roller center L1 of the outer rollers 15 is preferably a value within a range from ½ the track width w(16) of the inner track 16 to ½ the sum of the track width W(16) and the track width W(14) of the outer track 14. When the offset amount is less than these values, it may not be possible to ensure smooth rotation of the cross roller bearings because the deformation of precompression of the intermediate ring cannot be sufficiently suppressed. When the offset amount is greater than these values, there can be no further improvement of the effect of suppressing the deformation of precompression of the intermediate ring by causing offsetting, and the width dimension of the two-stage cross roller bearing in the direction of the center axial line increases, which is undesirable for making the two-stage cross roller bearing flatter.

$$W(16)/2 < \Delta < [W(16)+W(14)]/2$$

In the present example, to effectively suppress the deformation of precompression of the intermediate ring 12 and flatten the two-stage cross roller bearing 7, the offset amount Δ is ½ the track width W(14) of the outer track 14, and the roller center L2 is in a position moved toward the annular end face 12g from the roller center L1.

In the present example, to reliably prevent the deformation of precompression of the intermediate ring 12, the thickness t(12) of the intermediate ring 12 in the radial direction from a circular inner circumferential face 12d to a circular outer circumferential face 12e is set to at least twice the thickness t(11) of the outer ring 11 in the radial direction from a circular inner circumferential face 11d to a circular outer circumferential face 11e.

Furthermore, in the present example, the annular end faces on the inner sides of the outer ring 11, the intermediate ring 12, and the inner ring 13 are positioned substantially in the same plane, and the outer track 14 is in the side near the inner side end faces of the outer ring 11 and the intermediate ring 12, while the inner track 16 is in the side near the inner side end faces of the intermediate ring 12 and the inner ring 13. Insertion holes 12f, 13f for inserting rollers are formed in the inner side end faces of the intermediate ring 12 and the inner ring 13, and these insertion holes are sealed off by stoppers 18, 19. Thus, the outer track 14 and the inner track 16 are brought nearer to the end faces on the roller insertion side in the direction f the bearing center axial line 1a. Therefore, the two-stage cross roller bearing 7 can be easier to assemble.

The invention claimed is:

1. A unit type wave gear device (1) characterized in comprising:
   a tubular unit housing (2);
   a wave gear mechanism (3) coaxially disposed inside the unit housing (2); and
   an input shaft (4) passing through a center of the wave gear mechanism (3) and extending coaxially with the wave gear mechanism (3); wherein
   the unit housing (2) has a cylindrical member (5), an end plate (6) fixed to a first end face (5a) formed at one end of the cylindrical member (5) along an axial line (1a) of the cylindrical member, and a two-stage cross roller bearing (7) disposed on a side of a second end face (5b) formed at the other end of the cylindrical member (5) along the axial line (1a);
   the two-stage cross roller bearing (7) has an outer ring (11) fixed to the second end face (5b) of the cylindrical member (5), an intermediate ring (12) concentrically disposed on an inner side of the outer ring (11), an inner ring (13) concentrically disposed on an inner side of the intermediate ring (12), an outer track (14) of rectangular cross-section formed between the outer ring (11) and the intermediate ring (12), a plurality of outer rollers (15) rollably inserted into the outer track (14), an inner track (16) of rectangular cross-section formed between the intermediate ring (12) and the inner ring (13), and a plurality of inner rollers (17) inserted in a rollable state into the inner track (16);

the wave gear mechanism (3) has an annular rigid internally toothed gear (21), a flexible externally toothed gear (22) coaxially disposed on an inner side of the rigid internally toothed gear (21), and a wave generator (23) coaxially disposed on an inner side of the flexible externally toothed gear (22), wherein the flexible externally toothed gear (22) has a flexible barrel part (22a) having a cylindrical shape, a diaphragm (22b) widening outward in a radial direction from an end of the barrel part (22a) at a side of the two-stage cross roller bearing (7), a rigid boss (22c) having an annular shape and integrally formed in an outer circumferential edge of the diaphragm (22b), and external teeth (22d) formed in an outer circumferential face portion of the end of the barrel part (22a) at a side of the end plate (6), and wherein the rigid internally toothed gear (21) is fixed to the cylindrical member (5), the boss (22c) is fixed to the intermediate ring (12), and the wave generator (23) is fixed to the input shaft (4) extending through a center of the wave generator (23); and a shaft end part (4a) of the input shaft (4) on the side of the two-stage cross roller bearing (7) is fixed to the inner ring (13).

2. The unit type wave gear device (1) according to claim 1, in which a shaft end part of the input shaft (4) on the side of the end plate (6) is a protruding shaft end part (4d) that protrudes outward through a center through-hole (6a) in the end plate (6), the protruding shaft end part (4d) and the inner ring (13) can be fixedly connected to a side of a rotation input member.

3. The unit type wave gear device (1) according to claim 2, further comprising:

a hollow part (4c, 13c) extending through the input shaft (4) and the inner ring (13).

4. The unit type wave gear device (1) according to claim 1, in which a size of the inner rollers (17) is smaller than a size of the outer rollers (15), and a roller center (L2) of the inner rollers (17) is in a position offset from a roller center (L1) of the outer rollers (15) in a direction along the axial line (1a).

5. The unit type wave gear device (1) according to claim 4, in which an offset amount (Δ) of the roller center (L2) of the inner rollers (17) relative to the roller center (L1) of the outer rollers (15) is a value within a range from ½ a track width of the inner track (16) to ½ a sum of the track width of the inner track and a track width of the outer track (14).

6. The unit type wave gear device (1) according to claim 5, in which the offset amount (Δ) is ½ of the track width of the outer track (14).

7. The unit type wave gear device (1) according to claim 4, in which a thickness of the intermediate ring (12) in a radial direction from a circular inner circumferential face to a circular outer circumferential face is at least twice a thickness of the outer ring (11) in a radial direction from a circular inner circumferential face to a circular outer circumferential face.

8. The unit type wave gear device (1) according to any one of claims 4 to 7, in which the outer track (14) and the inner track (16) are formed at positions which are nearer to one end faces of the outer ring (11), the intermediate ring (12) and the inner ring (13) than the other end faces of these members, and insertion holes (12f, 13f) for inserting rollers are formed in said one end faces of the intermediate ring (12) and the inner ring (13), and the insertion holes are sealed off by stoppers (18, 19).

* * * * *